United States Patent

[11] 3,593,005

[72] Inventors Werner Flieg
Great Neck, N.Y.;
Mariano Baffo, Woburn, Mass.

[21] Appl. No. 767,295
[22] Filed Oct. 14, 1968
[45] Patented July 13, 1971
[73] Assignee Digitronics Corporation
Albertson, N.Y.

[54] TAPE READER
10 Claims, 5 Drawing Figs.

[52] U.S. Cl. 235/61.11 C, 235/61.11 A
[51] Int. Cl. G06k 7/04, G06k 7/06
[50] Field of Search 235/61.11, 111, 61.7 B; 340/149 A; 200/46; 178/6

[56] References Cited

UNITED STATES PATENTS

| | | | |
|---|---|---|---|
| 2,372,882 | 4/1945 | Daly | 235/61.11 |
| 2,843,319 | 7/1958 | Deutsch | 235/61.11 |
| 2,915,243 | 12/1959 | La Pointe | 235/61.11 |
| 3,024,983 | 3/1962 | La Pointe | 235/61.11 |
| 3,027,072 | 3/1962 | Levin | 235/61.11 |
| 3,164,692 | 1/1965 | Leuenberger | 235/61.11 |
| 3,336,448 | 8/1967 | Aiken | 235/61.11 |
| 3,480,726 | 11/1969 | Walker | 235/61.11 |

*Primary Examiner*—Daryl W. Cook
*Assistant Examiner*—Robert M. Kilgore
*Attorney*—Yuter & Fields ABSTRACT: This invention relates to a perforated tape reader comprising a bifurcated cantilevered mounted conductor urged toward a stationary contact by a cantilevered mounted spring, and movable away from the stationary contact against the action of the spring by a tape perforation-sensing ball restricted to vertical displacement and acting through a rod coupled to said bifurcated conductor.

In operation, normally the ball rides on the surface of a moving tape and maintains the bifurcated conductor separated from the stationary contact against the action of the cantilevered mounted spring. Upon the occurrence of a perforation, the ball moves partially through the tape, and the cantilevered mounted spring urges the bifurcated cantilevered mounted conductor into contact with the stationary contact.

INVENTORS
Werner Flieg
Mariano Baffo
BY
Yuter & Spiecens
ATTORNEYS

TAPE READER

This invention relates generally to a tape reader an more specifically to a reader for perforated tape which can be used in data communications equipment, automatic test systems, business machines and machine tool control equipment, for example.

It is an object of this invention to provide a perforated tape reader having tape perforation sensing elements which have a minimum amount of drag.

It is also an object of this invention to provide a perforated tape reader having tape perforation sensing elements which have increased wear characteristics.

It is another object of this invention to provide a perforated tape reader having contacts associated with the tape perforation-sensing elements which have reduced total contact bounce.

It is still another object of this invention to provide a perforated tape reader which is at rest both electrically an mechanically in between performing actual read operations.

It is an additional object of this invention to provide a perforated tape reader which can receive and operate with paper, paper-mylar, aluminized-mylar, solid mylar tapes and the like having thicknesses which can vary from 0.002 to 0.006 inches without requiring adjustments.

It is a further object of this invention to provide a perforated tape reader which is reliable in operation and economic to build.

Other and many of the attendant advantages of this invention will be readily appreciated as the invention becomes better understood by reference to the following detailed description when considered in connection with the accompanying drawings, wherein.

Similar reference characters refer to similar parts throughout the several views of the drawings.

Figure 1:
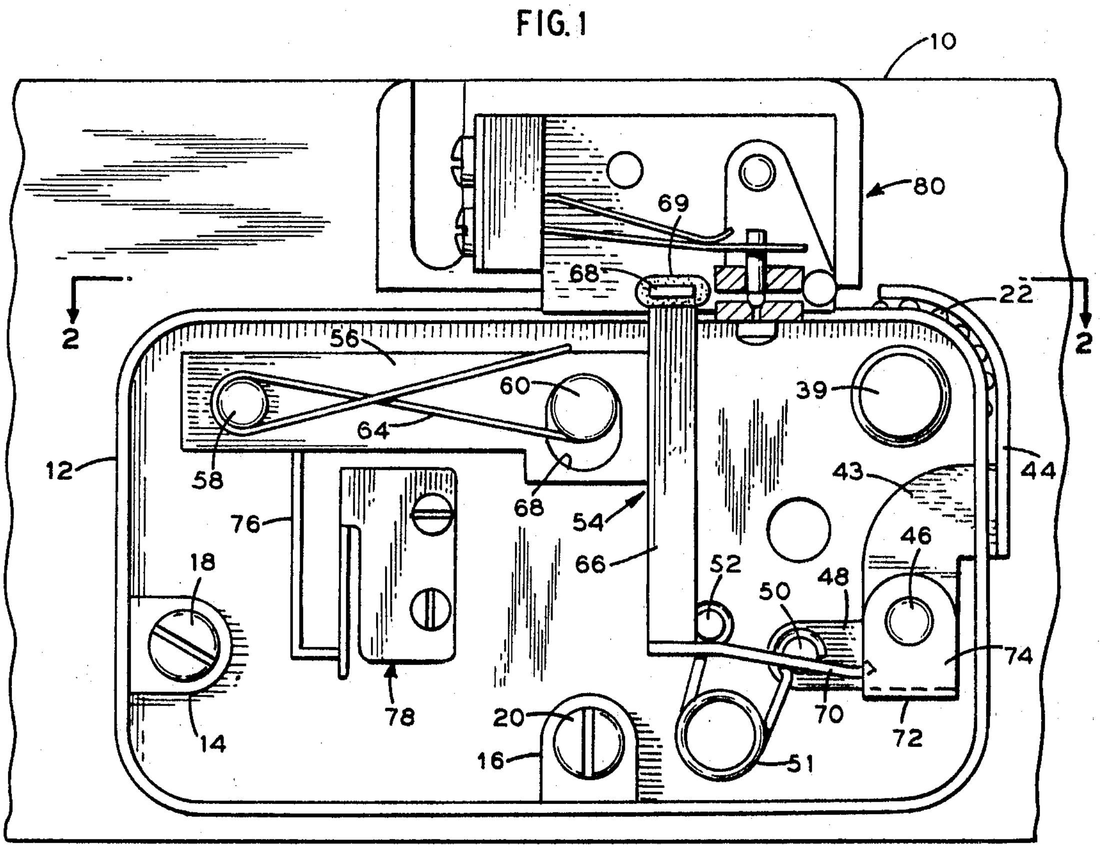
FIG. 1 is a side view, partially in section, of a structure constructed in accordance with this invention.

Referring to FIG. 1, a mounting plate 10 which can be composed of sheet metal such as aluminum or the like functions as a support for the various components and elements of the perforated tape reader and as a means to retain them in their proper positions relative to each other.

A tape support strip 12 composed of material such as steel or the like shaped into a substantially continuous loop having a rectangular shape and two inwardly projecting tabs 14, 16 each with a screw clearance cutout for a mounting screw is secured to the plate 10 by means of two screws 18, 20.

Projecting through the tape support strip 12 are teeth 22 of a sprocket wheel 24. The teeth are designed to engage without tearing or deforming the sprocket wheel teeth cutouts or perforations in a tape to pull the tape past a tape read head.

Figure 2:
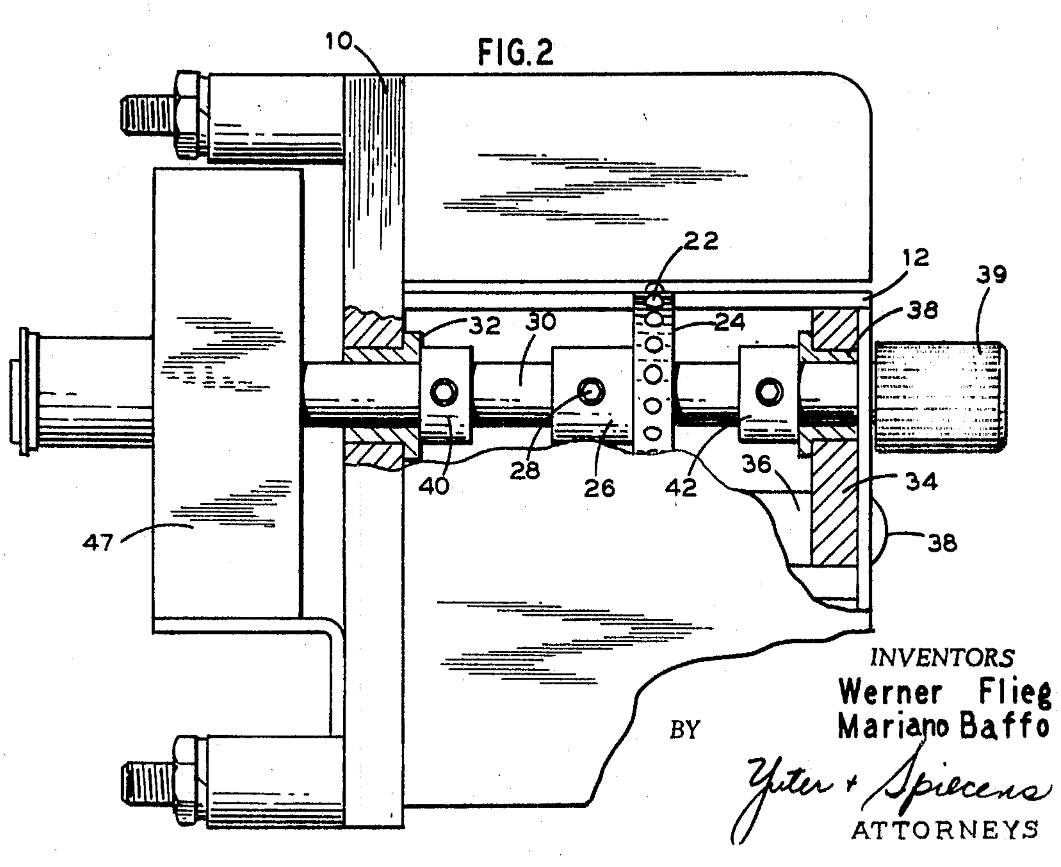
FIG. 2 is a view, partially in section, along the line 2–2 of FIG. 1 illustrating the paper drive sprocket wheel.

Referring to FIG. 2, the hub 26 of the sprocket wheel 24 contains a set screw 28, pin or the like to couple rigidly the sprocket wheel to a shaft 30. The shaft 30 is rotatably supported by the plate 10, a bushing 32 being positioned between the plate 10 and the shaft 30.

A front plate 34 maintained in position away from the plate 10 by spacers 36 is secured in place by bolts 38 which extend though the front plate 34, the spacers 36 and the plate 10. The front plate rotatably supports the other end of the shaft 30, a bushing 38 being positioned between the shaft 30 and the front plate 34.

Two collars 40, 42 secured rigidly to the shaft 30 and positioned to abut the flange bearings 32, 38 prevent axial displacement of the shaft 30 relative to the plate 10. A sprocket wheel drive means 47 which can be two solenoids acting through a pawl and ratchet structure or the like selectively steps the sprocket wheel on command from an external electrical pulsing means.

Returning to FIG. 1, a paper hold down bracket 44 shaped to follow the contour of the tape support strip 12 and containing a clearance cutout for the teeth 22 of the sprocket wheel is positioned to extend along each side of the sprocket wheel and is spaced from the tape support strip 12 is a distance sufficient to provide clearance for the perforated tape. The paper hold down bracket 44 is pivotally coupled through a connecting arm 43 to the plate 10 by a pin 46 and contains a supporting projection 48 to which is fastened securely a spring-engaging stud 50. A torsion spring 51 is positioned between stud 50 and another stud 52 which is coupled rigidly to the plate 10 urges the paper hold down bracket 44 to its operative or closed position as illustrated in FIG. 1.

A tape perforation brush lifter 54 supports a base member 56 which is pivotally connected to he plate 10 by pin 58, its rocking motion defined by the pin 60 fixed to plate 10 and positioned within elongated slot 62 of the base member 56. A spring 64, acting in tension engages the pin 60 at one end and one edge of the base member 56 at the other end to urge the base member to rotate counterclockwise about the pin 58 to its extreme position as defined by the pin 60 in slot 62. The coil of the spring 64 is positioned around and retained in position by the pin 58. A vertically positioned arm 66 connected to the base member 56 supports an upper offset arm 68 and a lower offset arm 70. The upper offset arm 68 is covered with an electrically insulating sleeve 69 with as rubber or the like and is positioned to urge the brushes upward to relieve the force on the tape perforation sensing mans when a new tape is being positioned into the tape reader. The lower offset arm 70 extends into engagement with the bottom member 72 of a U-shaped channel part hold down 44 formed by connecting arm 43, bottom member 72 and arm member 74.

An arm 76 extending from base member 56 is positioned to contact and selectively activate a microswitch 78 secured to plate 10 by two screws. The microswitch 78 secured to plate 10 by two screws. The microswitch 78 can be connected to deactivate the drive means when the brush lifter 54 is in its up position such as occurs when a new tape is being inserted into the reader.

A tape perforation-sensing means 81 is secured rigidly to plate 10 and is positioned to receive tape drawn through it by the sprocket wheel.

Figure 3:
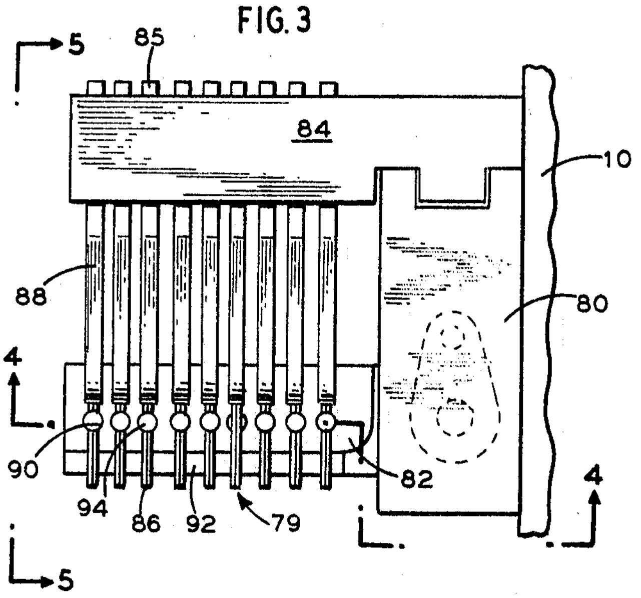
FIG. 3 is a top view of the brush block and tape perforation-sensing guide.

Referring to FIG. 3, a connecting block 80 secured rigidly to plate 10 supports a tape perforation-sensing guide 82 and brush block assemblage 84.

Figure 5:
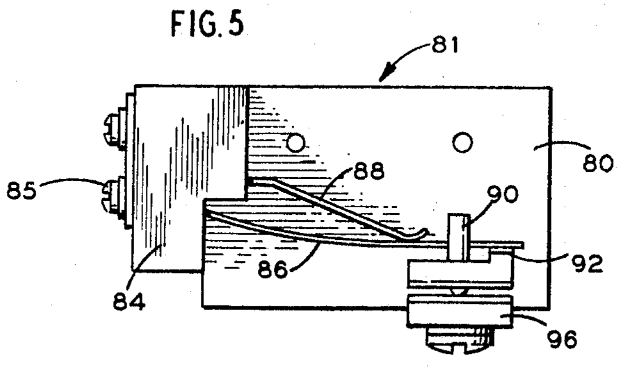
FIG. 5 is a view along the line 5–5 of FIG. 3.
Figure 4:
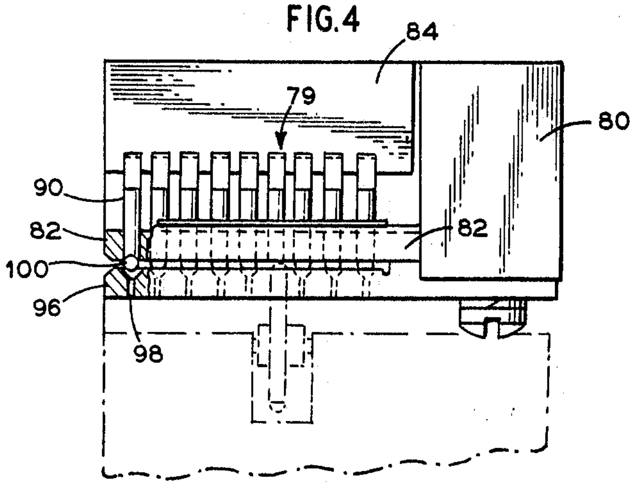
FIG. 4 is a view along the line 4–4 of FIG. 3.

Referring now to FIGS. 3, 4 and 5, the brush block support 84 supports nine brushes, the fourth brush 79 from the connecting block 80 being inactive as brush 79 coincides with the sprocket wheel position. Each brush 86 is made of two palladium lengths of wire positioned side by side.

One end of the wire is secured rigidly to the brush block assemblage 84 and each is coupled to a conductor through a screw terminal 85 to form a bifurcated contact.

An antibounce device in the form of a strip 88 which may be a spring steel or the like is secured rigidly at one of its ends to the brush block assemblage 84. The stainless steel strip 88 is positioned within the block 84 above the two lengths of wire 86, and bent toward the brush at an angle sufficient to permit the stainless steel strip 88 to first contact the two side by side or bifurcated wire brush 86 at a distance spaced from its free end.

The free end of each bifurcated contact 86 is positioned through a cutout in a nonconductive rod 90 and terminates at a conductor 92 common to all of the contacts. The rods 90 can be composed of teflon, nylon or the like and are sized to slide freely, without binding, within a guide channel 94 in the tape perforation-sensing guide 82.

The sensing guide 82 can be made of brass and the guide channels 94 can be spaced on centers of approximately 0.100 of an inch. The common conductor 92 can be of a material which has good electrical conducting characteristics secured by solder or the like to the brass sensing guide.

Positioned below and spaced from the tape perforation-sensing guide 82 is a stop means such as a ball-sensing plate 96 have a recessed entrance passageway 98 aligned with each guide channel 94. The distance between the sensing guide 82 and the ball-sensing plate 96 is sufficient to accommodate and allow free movement of a perforated tape.

A bearing ball 100 which may have a diameter of substantially 0.0625 inches and may be composed of high-carbon chrome alloy is positioned within each guide channel 94 between the rod 90 and the recessed entrance passageway 98. The recessed entrance of the passageway 98 is sized to freely accept the ball 100, however, the passageway 98 cannot accept the ball as it has a diameter that is smaller than the diameter of the ball 100.

Additionally, it is noted that the spacing between the tape perforation-sensing guide 82 and the sensing plate 96 is less than the diameter of the ball 100. Thus, the ball 100 is held captive within guide channels 94 of the tape perforation-sensing guide 82.

The relationship between the length of the nonconducting rod 90, the diameter of the ball 100, the recessed entrance of the passageway 98, and the position of the common conductor 92 is such that the bifurcated contacts 86 make electrical contact with the common conductor 92 when the ball 100 is urged through a perforation in a tape and enters the recessed entrance of the passageway 98. During those instances when a perforation is not present within the tape, the bifurcated contacts 86 do not make electrical contact with the common conductor 92.

In operation, a strip of perforated material such as paper, paper-mylar, aluminized-mylar, solid mylar and the like having thicknesses which can vary from 0.002 to 0.006 inches is first inserted into the reader. The paper hold down bracket 44 is rotated by the operator in a clockwise direction to expose the teeth of the sprocket wheel to facilitate the insertion of the tape. Clockwise rotation of the paper hold down bracket 44 urges bottom member 72 into driving contact with the lower offset arm 70 and the tape perforation contact lifter 54 is driven upward. As the tape perforation contact lifter 54 is urged upward, upper offset arm 68 engages and lifts the bifurcated contacts 86 to relieve the downward force on the bearing balls 100. The perforated tape now can be positioned easily between the tape perforation-sensing guide 82 and the ball-sensing plate 96, around the sprocket wheel and along the passageway between the tape support strip 12 and the paper holddown bracket 44.

Release of the paper holddown bracket 44 by the operator enables spring 51 to drive the bracket 44 counterclockwise to its stop position; and spring 64 to urge tape perforation-sensing lifter 54 downward to permit the stainless steel strip 88, acting through the bifurcated contacts 86 to exert full downward force on to the balls 100. A knurled knob 39 secured rigidly to shaft 30 permits the tape to be urged manually through the reader to insure proper threading of the perforated tape.

The sprocket wheel drive means can now be energized and the tape stepped through the reader. By applying a source of potential to the common conductor 92, the presence of a pulse signal will indicate the presence of a perforation in he tape for that brush position; and the absence of a pulse signal will indicate the absence of a perforation in the tape.

Obviously many modifications and variations of the present invention are possible in the light of the above teachings. It is, therefore, to be understood that within the scope of the appended claims the invention may be practiced otherwise than as specifically described.

What we claim is:

1. In a perforated tape reader, a brush support means, an electrically conductive brush cantilevered from said brush support means, a tape perforation-sensing guide means having at least one guide channel, an electrical contact coupled to said tape perforation-sensing guide means, spring mans cantilevered from said brush support means coupled to urge said electrically conductive brush toward said electrical contact stop means spaced from said tape perforation sensing guide means a distance sufficient to accept a perforated tape, a rod slidably coupled to said channel positioned to drive said electrically conductive brush away from said electrical contact and a ball slidably coupled to said channel and interposed between said rod and said stop means whereby said conductive brush contacts said electrical contact when the presence of a perforation in a tape positioned between said tape perforation-sensing guide means and said stop means is sensed by said ball.

2. The structure of claim 1 wherein said electrically conductive brush comprises two wires positioned adjacent to each other.

3. The structure of claim 2 wherein said electrically conductive brush is composed of palladium alloy.

4. The structure of claim 2 wherein said rod is composed of nonconductive material.

5. The structure of claim 4 wherein a ball is composed of high-carbon chrome alloy.

6. The structure of claim 2 wherein said rod supports a cutout and said conductive brush of two wires extends through said cutout of said rod.

7. The structure of claim 2 wherein said spring means comprises a flat strip.

8. The structure of claim 7 wherein said flat strip comprises stainless steel having a thickness less than 0.015 inches.

9. The structure of claim 6 wherein said stop means comprises a depression to receive said ball.

10. The structure of claim 9, and means for mounting said stop means is spaced relationship to said tape perforation sensing guide means whereby the spacing between said stop means and said tape perforation-sensing guide means is less than the diameter of said ball.